(12) United States Patent
Mancuso (10) Patent No.: US 8,359,781 B2
(45) Date of Patent: Jan. 29, 2013

(54) FISHING LURE

(76) Inventor: Peter Mancuso, Lake Grove, NY (US)

( * ) Notice: Subject to any disclaimer, the term of this patent is extended or adjusted under 35 U.S.C. 154(b) by 249 days.

(21) Appl. No.: 12/536,951

(22) Filed: Aug. 6, 2009

(65) Prior Publication Data

US 2011/0030265 A1 Feb. 10, 2011

(51) Int. Cl.
*A01K 85/01* (2006.01)

(52) U.S. Cl. ............... 43/42.31; 43/17.1; 43/26.2

(58) Field of Classification Search ............... 43/42.31, 43/17.1, 26.2, 17.6
See application file for complete search history.

(56) References Cited

U.S. PATENT DOCUMENTS

| | | | | |
|---|---|---|---|---|
| 3,120,073 A * | 2/1964 | Brunton | ............... | 43/17.1 |
| 3,841,012 A * | 10/1974 | Maled | ............... | 43/26.2 |
| 4,380,132 A * | 4/1983 | Atkinson | ............... | 43/26.2 |
| 4,625,447 A * | 12/1986 | Buchanan | ............... | 43/17.1 |
| 4,697,374 A * | 10/1987 | Simms | ............... | 43/17.1 |
| 4,805,339 A * | 2/1989 | Fuentes et al. | ............... | 43/42.31 |
| 5,046,278 A * | 9/1991 | Szilagyi et al. | ............... | 43/17.1 |
| 5,157,857 A * | 10/1992 | Livingston | ............... | 43/17.6 |
| 5,175,950 A * | 1/1993 | Linder | ............... | 43/17.1 |
| 5,175,951 A * | 1/1993 | Fruchey | ............... | 43/17.6 |
| 5,177,891 A * | 1/1993 | Holt | ............... | 43/17.1 |
| 5,485,697 A * | 1/1996 | Watson et al. | ............... | 43/42.31 |
| 5,697,182 A * | 12/1997 | Rodgers | ............... | 43/17.1 |
| 5,822,912 A * | 10/1998 | Kato et al. | ............... | 43/42.31 |
| 6,108,962 A * | 8/2000 | Barron | ............... | 43/42.31 |
| 6,192,617 B1 * | 2/2001 | Lyles | ............... | 43/17.1 |
| 6,389,735 B1 * | 5/2002 | Holt | ............... | 43/17.1 |
| 6,581,319 B2 * | 6/2003 | West | ............... | 43/17.1 |
| 6,647,659 B1 * | 11/2003 | King et al. | ............... | 43/17.6 |
| 6,665,976 B2 * | 12/2003 | West | ............... | 43/17.1 |
| 6,684,556 B1 * | 2/2004 | Arbuckle et al. | ............... | 43/17.1 |
| 6,789,347 B1 * | 9/2004 | West et al. | ............... | 43/17.1 |
| 6,804,909 B1 * | 10/2004 | West | ............... | 43/17.1 |
| 6,807,766 B1 * | 10/2004 | Hughes et al. | ............... | 43/17.1 |
| 6,910,294 B1 * | 6/2005 | Talbert | ............... | 43/42.31 |
| 7,325,357 B2 * | 2/2008 | Wiskur | ............... | 43/42.31 |
| 7,722,218 B2 * | 5/2010 | Leung et al. | ............... | 43/17.6 |
| 7,819,554 B2 * | 10/2010 | Leung et al. | ............... | 43/17.6 |
| 2002/0014031 A1 * | 2/2002 | Brinkman | ............... | 43/42.31 |
| 2009/0007480 A1 * | 1/2009 | Braun | ............... | 43/17.1 |
| 2011/0061287 A1 * | 3/2011 | Ogawa | ............... | 43/42.31 |

FOREIGN PATENT DOCUMENTS

| | | | | |
|---|---|---|---|---|
| DE | 19512031 | A1 * | 10/1996 | |
| GB | 2322530 | A * | 9/1998 | |
| GB | 2333431 | A * | 7/1999 | |
| JP | 2000189004 | A * | 7/2000 | |
| JP | 2002199828 | A * | 7/2002 | |
| JP | 2005304465 | A * | 11/2005 | |
| JP | 2011160714 | A * | 8/2011 | |
| WO | WO 9503691 | A1 * | 2/1995 | |
| WO | WO 03007707 | A1 * | 1/2003 | |
| WO | WO 2005065451 | A1 * | 7/2005 | |
| WO | WO 2005084431 | A1 * | 9/2005 | |
| WO | WO 2008151476 | A1 * | 12/2008 | |

* cited by examiner

*Primary Examiner* — Darren W Ark
(74) *Attorney, Agent, or Firm* — Michael L. Greenberg, Esq.; Greenberg & Lieberman, LLC (57) ABSTRACT

An electronic fishing lure that closes a circuit upon being submerged in water such that two distinct phases of operation are triggered. The first phase immediately begins once sensor pins protruding from the fishing lure casing detect that the fishing lure is submerged in water. This phase emits electronic impulse energy in a waveform that simulates an initial injury to a wounded living thing. The second phase then begins, which relates to a motor calibrated to cause vibrations that simulate the resulting distress and escape attempt of a living thing. The phases serve to attract predatory aquatic creatures toward the fishing lure.

1 Claim, 6 Drawing Sheets

FISHING LURE

FIELD OF THE PRESENT INVENTION

The present invention relates to an electronic fishing lure that closes a circuit upon being submerged in water such that two distinct phases of operation are triggered in a manner that simulates a scenario of injury and resulting distress for a wounded living thing.

BACKGROUND OF THE PRESENT INVENTION

Fishing is an activity that involves people of all walks of life and all experience levels. On any given day one may find a young child learning how to cast his or her first line with a parent or guardian. In addition, professionals and recreational fishermen often share the same streams, ponds, lakes, sounds, rivers, oceans and virtually all other bodies of water. But the ultimate goal for all who attempt to bait an aquatic creature into a hook or net is the same. And that is to catch fish.

Fishermen have long been searching for the best way to attract fish to their lines, hooks and nets. Oftentimes, people do not want to solely rely on the bait to attract fish, and instead opt for other items to assist in the fishing process. This includes everything from using scented products and shiny objects to gain the attention of these aquatic creatures. Modern technology offers more expensive and complex items such as electronic sonar equipment. But for the fisherman using a rod and reel, the most cost-effective and redeeming fishing tool to supplement bait, or even to serve as the bait, is the lure.

Traditional fishing lures come in all shapes and sizes. Many seek to attract the visual senses of fish by posing as typical prey. However, there remains a need for a lure that goes beyond visual stimulation and actually appeals to the natural instincts of predatory aquatic creatures. In addition, this need requires more than just mere sounds and signals to simulate nature. Instead, there needs to be a means of creating a more authentic and natural attraction for predatory aquatic creatures. The present invention solves this need by electronically luring aquatic creatures through a two-phase process that also is cost-effective. In addition, the present invention is such that both aspects of this two-phase process are dynamic in that the emitted electrical impulse energy and subsequent acoustic energy rise and taper off.

U.S. Pat. No. 6,804,909 issued to West on Oct. 19, 2004 is a vibrating fishing lure with water dynamics. West employs a weighted motor to cause the lure to vibrate. Unlike the present invention, West uses the motor to physically move the lure via the vibrations in a manner that is designed to visually stimulate the attention of passing predatory fish. In contrast, the present invention operates via a two-phase process that includes first emitting electrical impulse energy through the use of at least two electrodes and then following that with a second phase of emitting vibrations calibrated to emit acoustic sound energy. U.S. Pat. No. 7,325,5357 issued to Wiskur on Feb. 5, 2008 is an acoustical fishing lure. Wiskur uses an oscillating striker and tone wire to cause high frequency vibrations and sound waves. Unlike the present invention, Wiskur is merely an internal noisemaker that creates a certain level of sound. In contrast, the present invention is configured to operate via a two-phase process that includes first emitting electrical impulse energy through the use of at least two electrodes and then following that with a second phase of emitting vibrations calibrated to emit acoustic sound energy. In addition, the present invention is activated when sensor pins detect that they are submerged underwater.

U.S. Pat. No. 6,647,659 issued to King et al on Nov. 18, 2003 is a fishing lure that employs a battery to power a light emitting device or motor. Unlike the present invention, King closes the circuit only when the lure is in a specific position. In addition, King is essentially a noisemaker or light-emitting device depending on the chosen usage. In contrast, the present invention is configured to operate via a two-phase process that includes first emitting electrical impulse energy through the use of at least two electrodes and then following that with a second phase of emitting vibrations calibrated to emit acoustic sound energy. In addition, the present invention is activated when sensor pins detect that they are submerged underwater as opposed to reliance on specific positioning.

U.S. Pat. No. 5,485,697 issued to Watson et al on Jan. 23, 1996 is a fishing lure that emits pre-selected signal patterns through the use of a battery-powered oscillating circuit. Unlike the present invention, Watson merely emits electrical signals at a constant level when activated instead of being a dynamic simulation of natural attraction. Also in contrast to Watson, the present invention is configured to operate via a two-phase process that includes first emitting electrical impulse energy through the use of at least two electrodes and then following that with a second phase of emitting vibrations calibrated to emit acoustic sound energy. In addition, the present invention is activated when sensor pins detect that they are submerged underwater as opposed to reliance on specific positioning.

U.S. Pat. No. 4,380,132 issued to Atkinson on Apr. 19, 1983 is a fishing lure with vibration producing means. Atkinson is similar to other vibration-type lures in much of the same way as the aforementioned items. The present invention is different from all these existing lures in that the present invention is configured to operate via a two-phase process that includes first emitting electrical impulse energy through the use of at least two electrodes and then following that with a second phase of emitting vibrations calibrated to emit acoustic sound energy. In addition, the present invention is activated when sensor pins detect that they are submerged underwater as opposed to reliance on specific positioning.

Based on the existing lures, there remains a need for an item that satisfies more than just noise simulation. Instead, there is a need for a dynamic process that simulates not only the initial disablement or wounding of a living thing, but also the aftermath that includes distress and escape attempt. The present invention solves this need by closing a circuit upon being submerged in water such that two distinct phases of operation are triggered in a manner that simulates a scenario of injury and resulting distress for a wounded living thing.

SUMMARY OF THE PRESENT INVENTION

The present invention is a fishing lure that receives power via a replaceable battery. The lure is comprised of a sealed and water-resistant casing that protects the battery and electronic circuit components contained inside. At least one sensor pin is exposed to the outside elements and is placed in communication with the conventional electronic circuit contained inside the casing. The sensor pin is configured via conventional means to detect when the present invention is submerged underwater. Once the at least one sensor pin detects that the present invention is submerged, the circuit will be closed.

Power from the battery will then move through the circuit to cause an electrical impulse to be emitted. This electrical impulse of electrons into the water is calibrated in a manner to simulate the outgoing energy and trauma of a living thing being wounded. The electrical impulse will begin at a peak rate and then reduce until it becomes a low-level flow. After the electrical impulse begins and starts its course of dissipation, a motor contained within the casing will begin to rotate. The calibrated rotation of the motor will begin at a low rate and work its way up to peak speed. The motor rotation will then taper off until it also reaches a low-level. The vibrations associated with the motor rotation are calibrated in such a manner to simulate the actions of a wounded living thing. The living thing can be any type of prey to include fish, amphibians, reptiles, waterfowl and bugs.

DETAILED DESCRIPTION OF THE PRESENT INVENTION

Figure 6:
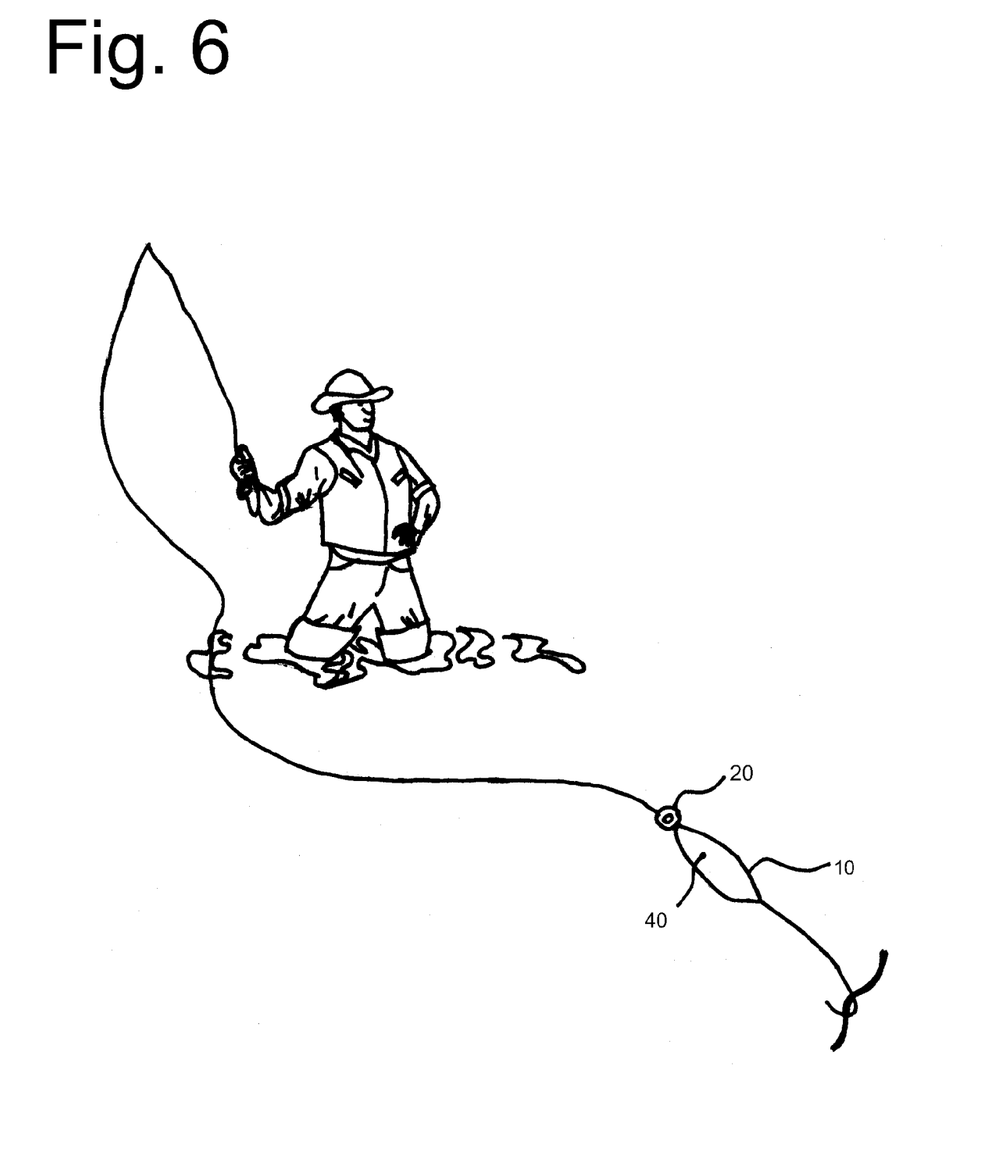
FIG. 6 is an example of the present invention in use.

The present invention attracts fish and other aquatic life to its immediate vicinity. In the preferred embodiment, a user will cast a fishing line into the water. The present invention will be placed at a relatively close distance from the actual bait and hook as seen in FIG. 6. The preferred embodiment is to place the present invention at a distance from one to three feet from the hook or bait that also will be in communication with the fishing line. In this manner, a user will cast the fishing line so that the present invention enters the water a short distance apart from the hook, bait or net. Fish and other relevant aquatic life will then be attracted to the function of the present invention, which ultimately will lead them to the hook, bait or net. This attraction operates in two phases. The first is by simulating the outgoing energy and trauma of a living thing being wounded. The second phase is to simulate the actions of a wounded living thing after being wounded. The order and function of these simulations effectively trick predatory aquatic creatures into their natural predisposition of seeking a wounded creature for food. From there, the predatory aquatic creature typically will attempt to consume the bait so long as the bait is appropriate for that type of aquatic creature. In addition, the aquatic creature also will be lured to the vicinity of the present invention, which can make the aquatic creature susceptible to being captured via a net or other collection device.

Figure 1:
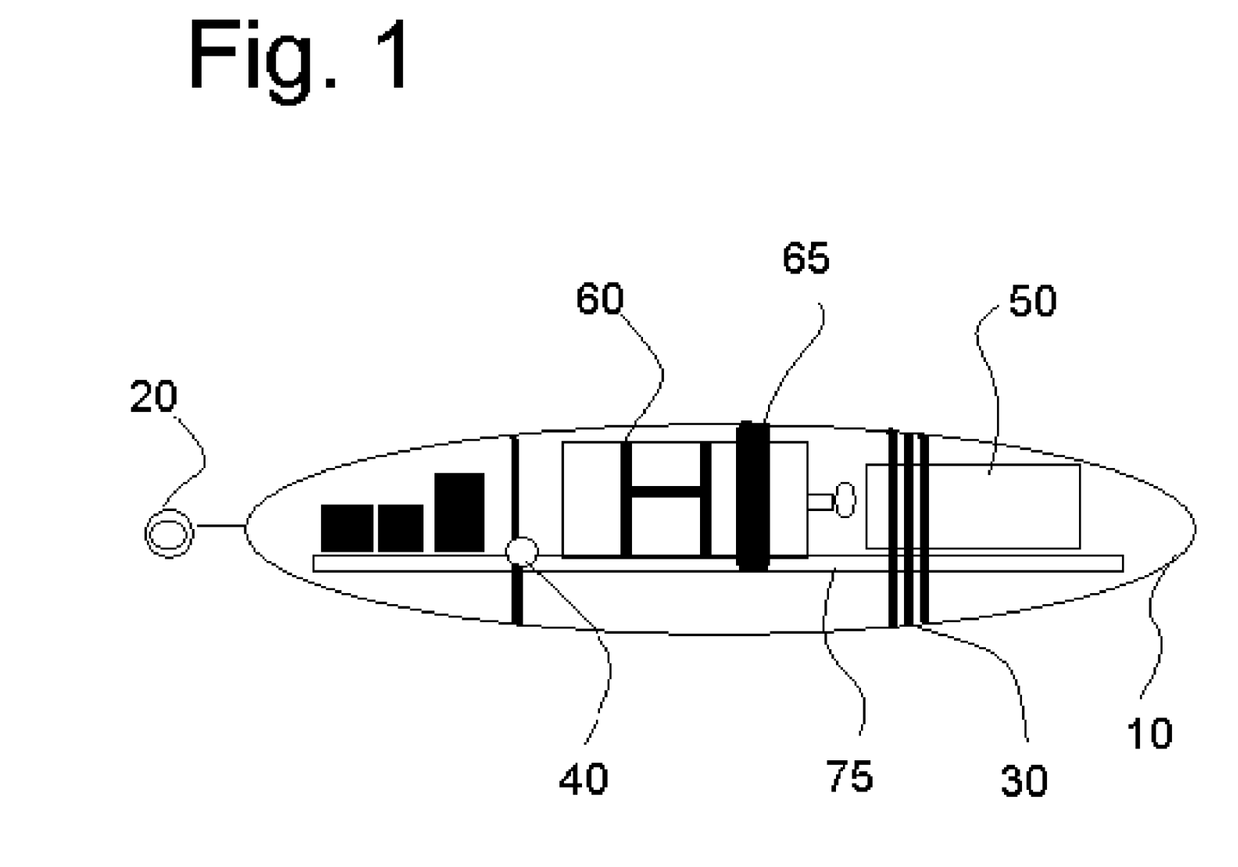
FIG. 1 is a view of the internal components of the present invention.

FIG. 1 is a view of the internal components of the present invention. In the preferred embodiment, the internal components are surrounded and protected by a casing (10). The casing (10) is conventionally formed so that it is waterproof. In that manner, the casing (10) protects the internal components from water. An eyelet (20) is attached to at least one end of the casing (10). The eyelet (20) is formed so that the fishing line can be secured to the casing (10) of the present invention. A base (30) built into the casing permits a user to loosen or tighten at least one screw (35). When the at least one screw (35) of the base (30) is removed and the base (30) is opened, a compartment inside the present invention permits a battery (50) to be placed inside the compartment. Conventional components associated with battery power and distribution are included within the compartment and casing (10). The battery (50) provides power to the present invention. An alternative embodiment relates to a rechargeable battery (50) that receives its renewed power via a conventional USB port located within the sealed compartment. However, the preferred embodiment is such that the user opens the base (30) and replaces the battery (50) when needed.

The battery (50) provides power to a motor (60) via a conventional Q1 (260) drive circuit. The battery also provides power to at least two electrodes (40) that protrude out from two sides of the casing (10) of the present invention. However, the preferred embodiment relates to at least two electrodes (40). The at least two electrodes (40) are also referred to as the sensor pins (40). The at least two electrodes (40) serve to close the circuit when submerged in water. Two electrodes are needed to transmit the pulse into the water based on conventional electron flow. However, in an additional embodiment, it is envisioned that the body or casing (10) of the present invention can be configured to serve as one of the electrodes to work in conjunction with another electrode protruding outward as described above.

Figure 2:
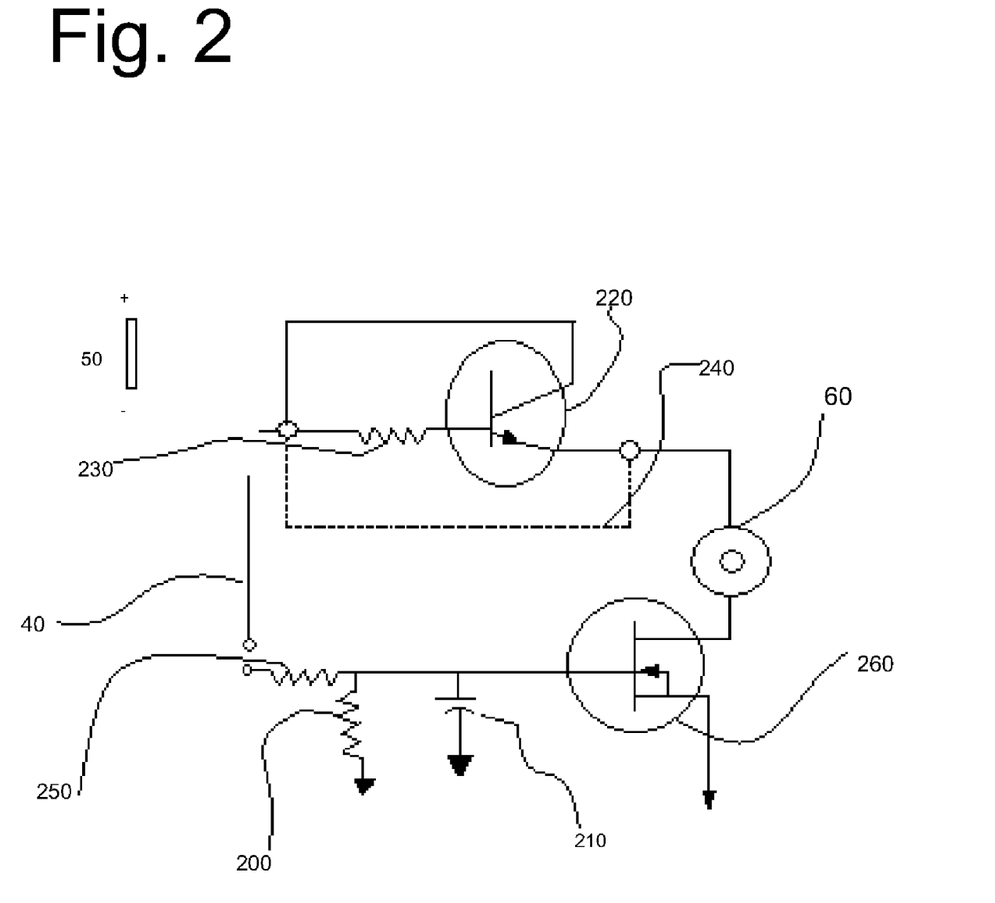
FIG. 2 is a schematic view of a low power embodiment of the present invention.
Figure 3:
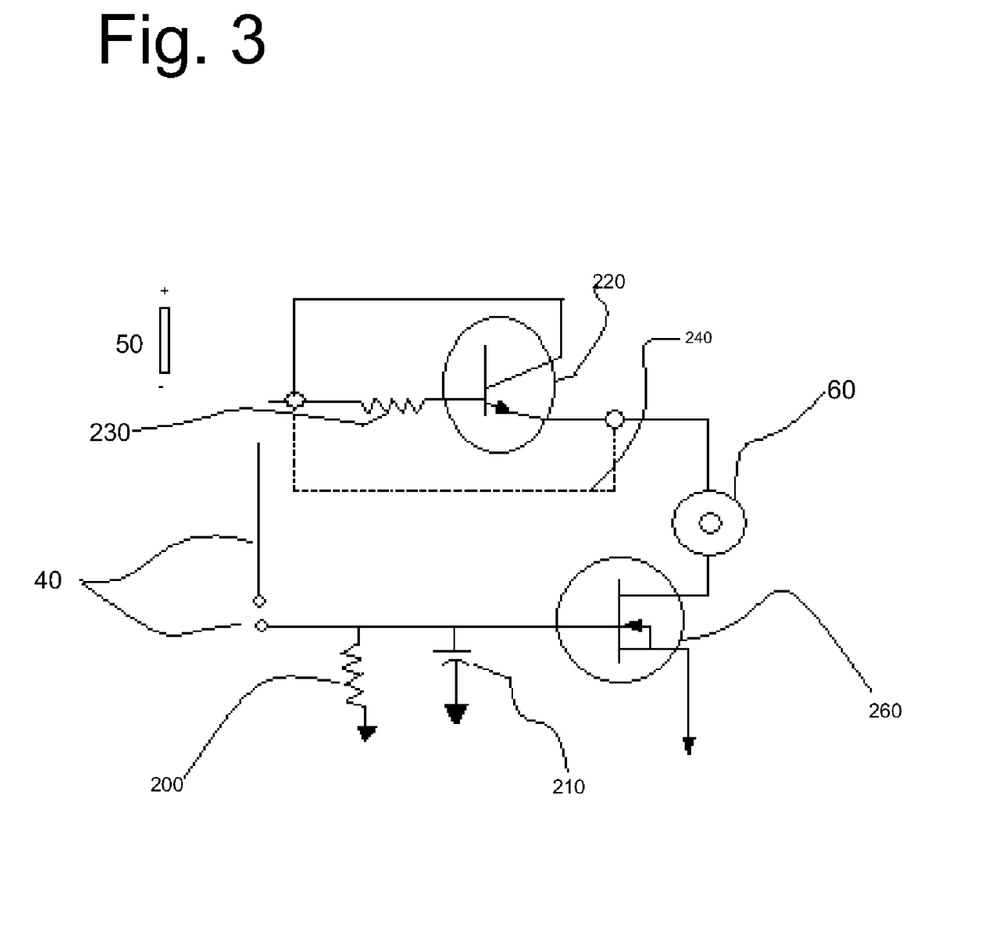
FIG. 3 is a schematic view of a medium to high power embodiment of the present invention

As we see in FIG. 2 and FIG. 3, the sensor pins (40) protrude outward while maintaining a connection with the internal components of the present invention. The sensor pins (40) are configured via conventional means to detect when the present invention is submerged underwater. Once the at least one sensor pin (40)—or sensor pins (40) as they also are referred—detects that the present invention is submerged, the circuit will be closed via conventional means. When the sensor pins (40) detect that the present invention is submerged underwater, the circuit will remain closed for the duration of the submerged status. This means that the power from the battery (50) will flow through the circuit as seen in FIG. 2 and FIG. 3. Conversely, the circuit opens when the sensor pins (40) stop or otherwise do not detect submersion underwater.

The present invention operates in two phases once the sensor pins (40) detect that the present invention is submerged and subsequently close the circuit. The first phase is that immediately upon submersion, the electrodes (40) formed with the sensor pins (40) will conduct an electron flow. This electron flow is emitted into the water via conventional means through the protruding electrodes (40) in the form of electrical impulse energy. This electrical impulse of electrons into the water is conventionally calibrated in a manner to simulate the outgoing energy and trauma of a living thing being wounded. For example, the preferred embodiment relates to a quick pulse that initially is emitted once the present invention is submerged. That pulse simulates such natural scenarios as a lifeform being cut, bitten or otherwise injured in the water. The electrical impulse appeals to the natural instinct of predatory aquatic creatures to feed on disabled animals. The result is that the predatory aquatic creatures will often rush to the originating vicinity of the electrical impulse.

Figure 4:
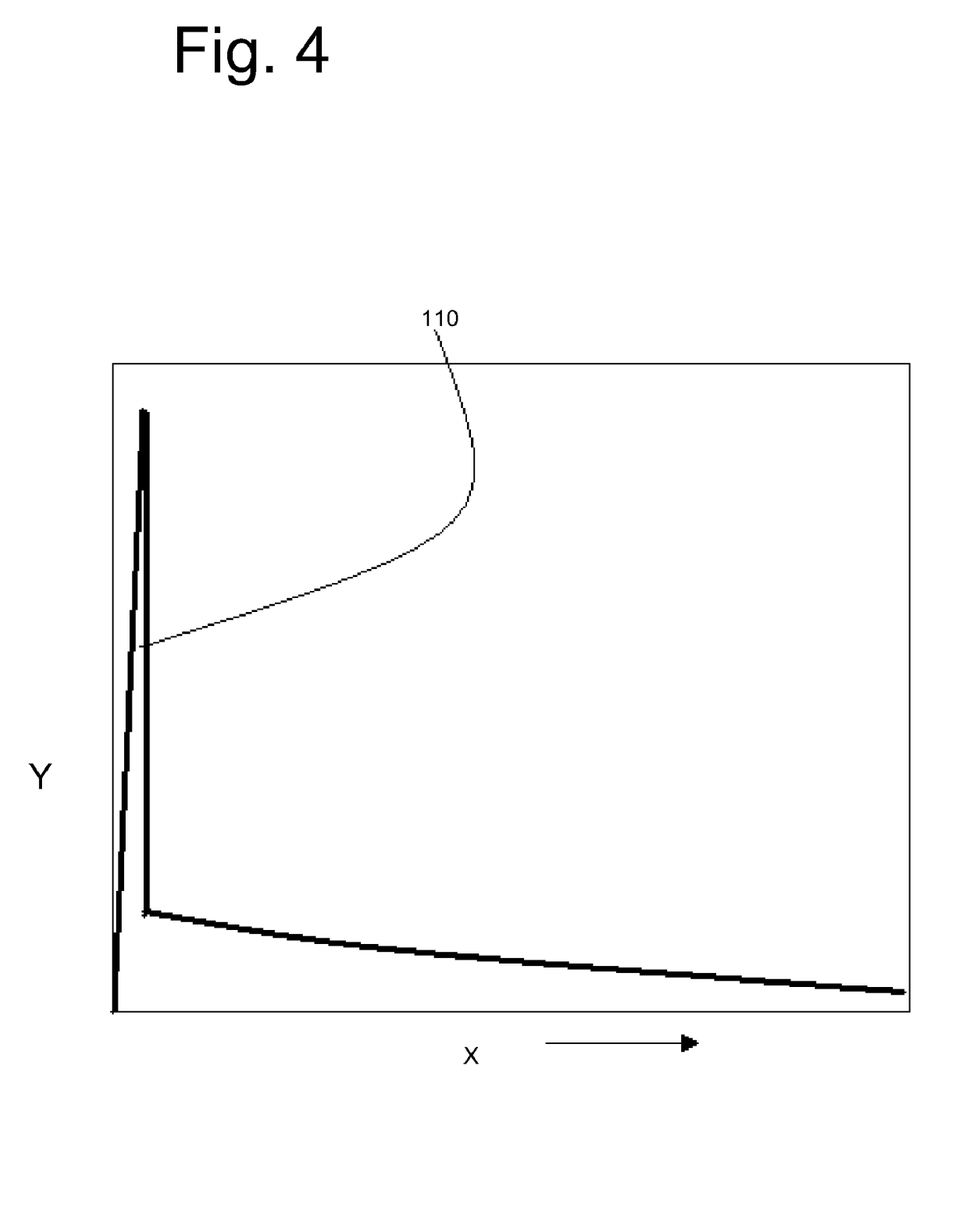
FIG. 4 is a graph demonstrating an example of the waveform for an electrical impulse of the present invention.

As we see in FIG. 4, the x-axis represents time and the y-axis represents amperage. FIG. 4 demonstrates the waveform (100) and span of the electrical impulse emission. This waveform (100) displays how the electrical impulse mimics the action of pulse and decay through an immediate peak of electrical impulse being emitted into the water. For example, the immediate pulse in the preferred embodiment is between 10 microseconds to 23 microseconds, with 20 microseconds being the preferred amount of time. After the initial peak emission of the electrical impulse, the emission will drastically be reduced. In other words as seen in FIG. 4, the electrical impulse will begin at a peak rate and then reduce until it becomes a low-level flow ultimately simulating the energy effects of a dying creature. The reason the present invention is calibrated to emit the electrical impulse in this manner is to simulate the natural shock and aftermath of a traumatic experience that may occur naturally among living creatures.

The second phase of the present invention occurs at a point of time when the electrical impulse of FIG. 4 is waning or otherwise after it reaches its peak amperage. At this point, the motor (60) of the present invention begins to rotate. The rotation of the motor (60) generates acoustic sound energy in the form of mechanical vibration. An alternative embodiment relates to other conventional forms of a sound device (60).

The effect of the sound energy being emitted from the motor (60) is to simulate the natural movements of an injured creature attempting to escape. The reason the motor (60) receives the requisite power form the battery (50) after the peak amperage of the electrical impulse is to simulate the natural effects of the initial injury through the electrical impulse followed by the escape attempt through the motor (60) or sound device vibrations. The electrical resource used to initiate the first phase followed by the second phase as described above is seen in FIG. 2 and FIG. 3. The battery (50) of an appropriate voltage is in communication with the tank circuit of R1 (200), also referred to as resistor 1, and C1 (210), also referred to as capacitor 1, in order to utilize the sensor pins (40). The forward action then drives Q1 (260), also referred to as transistor 1 to ultimately drive the motor (60) to rotate.

Figure 5:
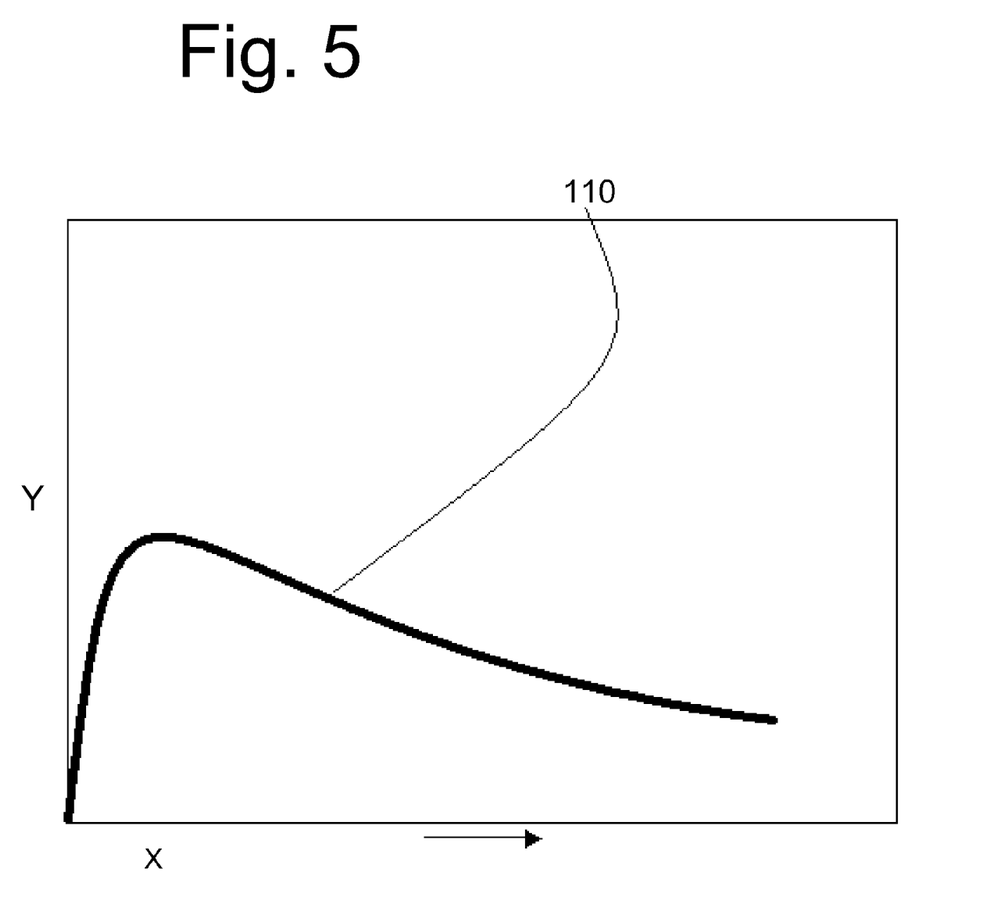
FIG. 5 is a graph demonstrating an example of the motor rotational speed of the present invention.

The rotation speed of the motor (60) is calibrated to simulate the natural motions inherent with an injured animal. FIG. 5 demonstrates the acoustic waveform (110) of the motor vibration to display the preferred maximum and decay rotation. As we see in FIG. 5, the x-axis represents time and the y-axis represents motor speed. The mechanical vibration of the motor (60) movement creates acoustic energy in conjunction with the motor (60) rotation. This acoustic energy is emitted through the course as seen in the acoustic waveform (110) of FIG. 5. In contrast to the electrical impulse energy of the first phase amperage as seen in FIG. 4, we see in FIG. 5 that the motor speed begins at a low level and a bit more gradually ascends to its peak. From there, the motor speed tapers off in a more gradual level than the drastic peak and valley of the electrical impulse energy amperage.

The motor speed is dependent on the maximum rotation of the motor (60). The preferred embodiment relates to the motor speed between 4 KHz and 5 KHZ with 4.8 KHZ being considered optimal in the preferred embodiment. The shaft of the motor (60) is loaded with a weight that is between 550 mg and 650 mg in the preferred embodiment. The loading as described creates the conditions for the rotation and decay of the motor rotation speed, as well as the acoustic waveform (110) as seen in FIG. 5. In regard to the electrical aspect of this function, this is displayed in FIG. 2 and FIG. 3. As we see, the current limiting drive circuit created by Q2 (220), also referred to as transistor 2, is in forward bias through the battery (50) and R2 (230), also referred to as drive resistor 2. However, it should be noted that larger embodiments of the present invention can operate with the same functions as described above through the use of a motor (60) with a higher potential drive coil, as well as a jumper, or J1 connection (240), in place of Q2 (220) and R2 (230). FIG. 2 and FIG. 3 provide a view of this alternative embodiment in its display of J1 (240). In regard to smaller or low-power embodiments of the present invention, R3 (250), also referred to as resistor 3, is implemented in order to reduce the electrical impulse energy that is transferred into the water. The low power embodiment relating to R3 (250) can be seen in FIG. 2.

The motor (60) itself in the preferred embodiment is contained within the internal unit of the present invention via a strap (65). The strap (65) in the preferred embodiment is soldered or otherwise affixed to the motor (60). The strap (65) also is affixed to the pc board (75) or otherwise affixed to the internal unit of the present invention. This attachment is such that the strap (65) will vibrate when the motor (60) is receiving power from the battery (50). The vibration of the strap (65) will then cause the casing and overall present invention to vibrate.

FIG. 6 is a view of the present invention during an actual act of fishing. As we see in FIG. 6, the present invention is attached to the fishing line via the eyelet (20). The actual usage of the present invention is in conjunction with most forms of fishing to include jig, trolling and beach casting, along with virtually any type of bait such as worms, lures, etc. The embodiment of FIG. 6 demonstrates how the present invention is located at a distance apart from the bait and hook. However, additional embodiments envision merely attaching the present invention to the fishing line as it is submerged underwater. In this manner, aquatic creatures will be attracted to the present invention through the means described above. In this manner, a net or other trapping device can be employed to gather the aquatic creatures. Also, the size and power level of the present invention is not limited in regard to various embodiments and can be formed larger or smaller to relate to the type of fish and water being used. For example, a smaller to medium size and lower to medium power is envisioned via the ranges described above for most fresh water and saltwater locations. Meanwhile, larger size and higher power via the ranges described above is envisioned for deep-sea locations. These ranges are important as they fall within a desired spectrum that relates to the naturally simulated effects of the present invention.

An additional embodiment of the present invention includes a means to cause the present invention to float. In this manner, the system and two-phase process of the present invention as described above will continue to be re-triggered. This will cause the aquatic creatures to be attracted to the electrical impulse energy and the sounds/vibrations being emitted to occur over and over in a repeated fashion pursuant to the process described above.

Having illustrated the present invention, it should be understood that various adjustments and versions might be implemented without venturing away from the essence of the present invention. The present invention is not limited to the embodiments described above, and should be interpreted as any and all embodiments within the scope of the following claims.

I claim:

1. An electronic fishing lure, comprising:
    a casing configured to be waterproof;
    an eyelet attached to at least one end of said casing;
    a base built into said casing, said base configured to be removable;
    a compartment located within said casing at said base, said compartment configured to house a battery;
    said battery configured to be connected to a circuit such that said battery is in communication with a motor and at least two electrodes;
    said at least two electrodes protrude outward from said casing such that sensors contained within said at least two electrodes can determine when said at least two electrodes are submerged underwater;
    said at least two electrodes configured to close said circuit upon determination of being submerged underwater;

said at least two electrodes configured to emit an electron flow into the water in the form of electrical impulse energy upon closing of said circuit when supplied with power from said battery that is in communication with a first resistor and a first capacitor;

said motor configured to rotate after the electrical impulse energy emitted by said at least two electrodes reaches its peak amperage, said motor configured to create acoustic energy through vibrations of a rotation of said motor;

wherein said eyelet configured such that fishing line can be placed therethrough;

wherein said circuit is configured to remain closed via said at least two electrodes for the duration of water submersion;

wherein said at least two electrodes when supplied with power from said battery that is in communication with said first resistor and said first capacitor are configured to emit the electrical impulse energy in a waveform that begins with an initial peak emission of the electrical impulse energy followed by a drastic reduction in the electrical impulse energy;

wherein said at least two electrodes are configured to emit the initial peak emission at a range of between 10 microseconds and 23 microseconds;

wherein said battery is in communication with said first resistor and said first capacitor;

wherein said circuit is configured such that forward action drives a first transistor to drive and cause said motor to rotate;

wherein said motor is configured when supplied with power from said battery that is in communication with a second resistor to rotate at a lower level of speed than the initial peak emission of said at least two electrodes, with said motor configured to then gradually increase its rotational speed until reaching peak speed;

wherein said motor is configured to taper off its rotational speed to a gradual level after reaching peak speed when supplied with power from said battery that is in communication with said second resistor;

wherein said motor is configured to a maximum rotational speed of between 4 KHz and 5 KHz;

wherein a shaft of said motor is loaded with a weight between 550 mg and 650 mg;

wherein said circuit is configured to employ a second transistor in forward bias through said battery and said second resistor;

wherein a strap is affixed to said motor and said circuit, said circuit in communication with said casing; and wherein said strap is configured to vibrate when said motor is rotating, having the effect of causing said casing to vibrate.

* * * * *